United States Patent
Satoh et al.

(10) Patent No.: US 7,010,273 B2
(45) Date of Patent: Mar. 7, 2006

(54) HIGH-FREQUENCY COMPOSITE SWITCH MODULE

(75) Inventors: Yuki Satoh, Osaka (JP); Hiroshi Kushitani, Izumisano (JP); Riho Sasaki, Hirakata (JP); Narihiro Mita, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 241 days.

(21) Appl. No.: 10/381,657

(22) PCT Filed: Aug. 30, 2002

(86) PCT No.: PCT/JP02/08794

§ 371 (c)(1),
(2), (4) Date: Sep. 11, 2003

(87) PCT Pub. No.: WO03/026154

PCT Pub. Date: Mar. 27, 2003

(65) Prior Publication Data

US 2004/0048634 A1    Mar. 11, 2004

(30) Foreign Application Priority Data

Sep. 14, 2001 (JP) ............................. 2001-279933

(51) Int. Cl.
*H04B 1/44* (2006.01)
(52) U.S. Cl. .............................. 455/83; 455/78; 455/73
(58) Field of Classification Search .................. 455/73, 455/78, 82, 83, 553.1; 333/103, 117
See application file for complete search history.

(56) References Cited

U.S. PATENT DOCUMENTS

| | | | |
|---|---|---|---|
| 6,856,213 B1* | 2/2005 | Tsurunari et al. | 333/133 |
| 6,911,890 B1* | 6/2005 | Satoh et al. | 336/200 |
| 2002/0137471 A1* | 9/2002 | Satoh et al. | 455/83 |
| 2003/0048154 A1* | 3/2003 | Satoh et al. | 333/133 |
| 2004/0071111 A1* | 4/2004 | Satoh et al. | 370/329 |
| 2004/0075491 A1* | 4/2004 | Kushitani et al. | 330/51 |
| 2004/0119560 A1* | 6/2004 | Tsurunari et al. | 333/133 |

FOREIGN PATENT DOCUMENTS

| | | |
|---|---|---|
| JP | 10-32521 | 2/1998 |
| JP | 11-154804 | 6/1999 |
| JP | 2000-156651 | 6/2000 |
| JP | 2001-102957 | 4/2001 |
| JP | 2001-211097 | 8/2001 |

* cited by examiner

*Primary Examiner*—Nick Corsaro
*Assistant Examiner*—Lewis West
(74) *Attorney, Agent, or Firm*—Wenderoth, Lind & Ponack, L.L.P.

(57) ABSTRACT

A high-frequency hybrid switch module arranged applicable to at least two different communications systems includes two low pass filters (LPFs), two phase shifters, a field effect transistor (FET) switch including FETs, and two SAW filters. The FETs and the SAW filters are mounted on a layered assembly including the LPFs and an electrode pattern of the phase shifters. The module can have a small overall size, a low cost, and a small loss, while being protected from static electricity. The module requires small number of low-noise amplifiers at a signal receiving side.

34 Claims, 10 Drawing Sheets

HIGH-FREQUENCY COMPOSITE SWITCH MODULE

TECHNICAL FIELD

The present invention relates to a high-frequency hybrid switch module usable in a mobile communications apparatus, such as a mobile telephone.

BACKGROUND ART

Components in a mobile telephone are required to have reduced sizes and small signal loss.

Figure 12:
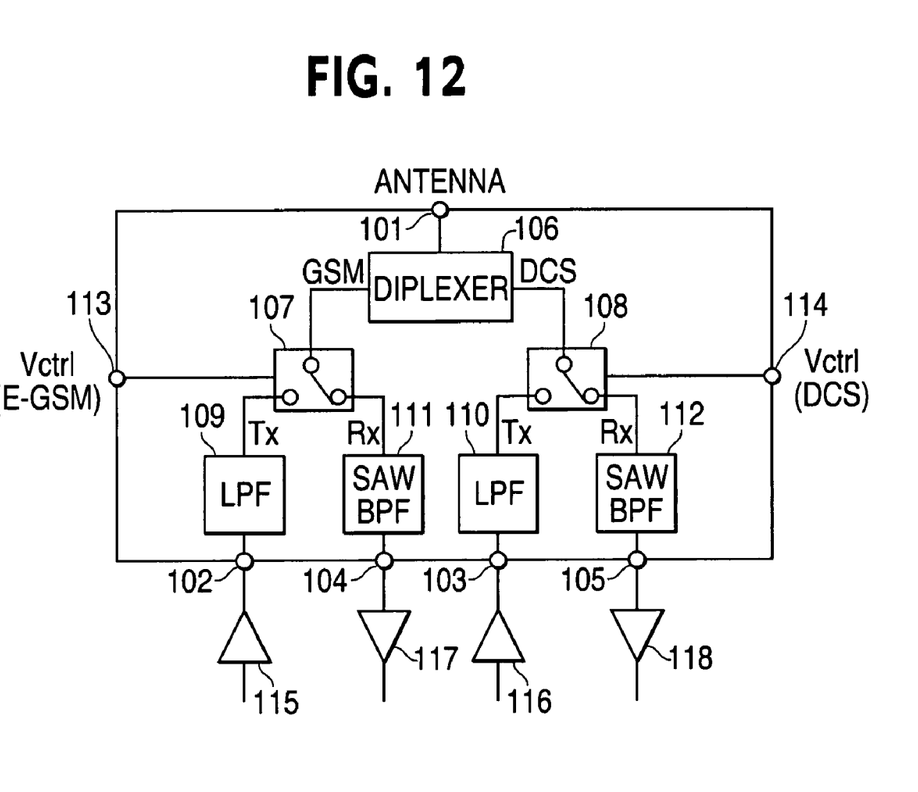
FIG. 12 is a block diagram of a conventional high-frequency circuit.

FIG. 12 is a circuitry block diagram of an antenna front end in a GSM (880–915 MHz for transmission and 925–960 MHz for reception)/DCS (1710–1785 MHz for transmission and 1805–1880 MHz for reception) dual-band mobile telephone, which is available worldwide, particularly in Europe. The antenna front end incorporates a switch for switching signals received and to be transmitted at the antenna. The front end generally includes an antenna port 101, transmitting ports 102 and 103, receiving ports 104 and 105, a diplexer 106 for mixing and splitting over GSM and DCS signals, a transmission/reception switch 107 for GSM signal, a transmission/reception switch 108 for DCS signal, low-pass filters (LPFs) 109 and 110 for removing harmonics from the GSM transmission signal and the DCS transmission signal, respectively, band-pass filters (BPFs) 111 and 112 for passing the GSM band and the DCS band, respectively, control ports 113 and 114 for controlling the GSM signal transmission/reception switch and the DCS signal transmission/reception switch, and a surface acoustic wave (SAW) filter. Each of the transmission/reception switches 107 and 108 may commonly be implemented by a switching circuit including diodes 119 and 120 and a transmission line 121 having an electrical length of λ/4, as shown in FIG. 13.

The front end additionally needs low-noise amplifiers (LNAs) 117 and 118 connected to the receiving ports 104 and 105. The connection may become intricate if a system is graded up to triple or quadruple bands. The triple band system requires three LNAs, while the quadruple band system requires four LNAs.

Figure 13:
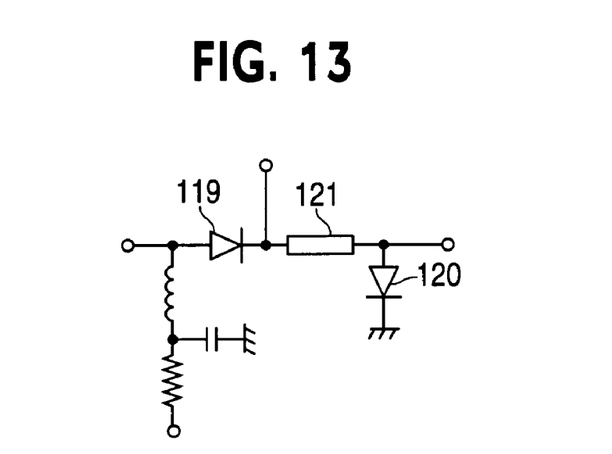
FIG. 13 is a conventional switching circuit.

The conventional circuit shown in FIG. 13 includes transmission/reception switches each composed of the diodes 119 and 120 and is thus unfavorable for reduction of the overall size. Also, a loss in the diplexer 106 is about 0.4 dB in the GSM signal band and 0.6 dB in the DCS signal band. Since a power for signal transmission has to be increased to compensate the loss in the diplexer, a battery lasts short. The signal reception declines in sensitivity by the loss in the diplexer. The conventional circuit is not protected from static-electricity breakdown. Moreover, the conventional circuit of a triple or quadruple band mode includes three or four LNAs and hence has large overall dimensions and cost.

SUMMARY OF THE INVENTION

A high-frequency hybrid switch module includes an antenna port, a field effect transistor (FET) switch coupled to the antenna port and including an FET, a control port for controlling the FET switch, first and second transmitting ports, a first low pass filter (LPF) provided between the first transmitting port and the FET switch, a second LPF provided between the second transmitting port and the FET switch, first and second surface acoustic wave (SAW) filters each having one end coupled to the FET switch, and first and second phase shifters connected in series with the first and second SAW filters, respectively.

The module further includes a layered assembly having the FET switch and the first and second SAW filters mounted thereon. The layered assembly includes a dielectric layer, and an electrode pattern provided on the dielectric layer for serving as at least a portion of the first and second LPFs and the first and second phase shifters.

The high-frequency hybrid switch module has a small overall size, a decreased cost, and a diminished loss.

DESCRIPTION OF THE PREFERRED EMBODIMENT (Exemplary Embodiment 1)

Figure 1:
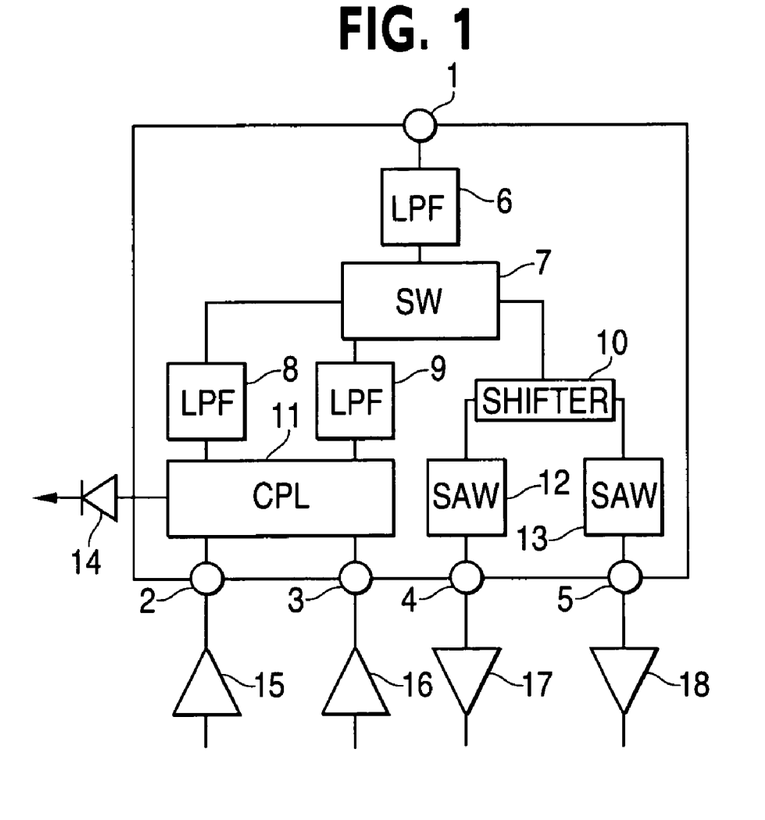
FIG. 1 is a circuitry block diagram of a high-frequency hybrid switch module according to exemplary embodiment 1 of the present invention.

FIG. 1 is a circuitry block diagram of a high-frequency hybrid switch module according to exemplary embodiment 1 of the present invention. The module includes an antenna port 1, transmitting ports 2 and 3 for the respective systems using two different frequencies, receiving ports 4 and 5 for the systems using the different frequencies, a low pass filter (LPF) 6 connected directly to the antenna port 1, a switch 7 functioning as an SP3T, LPFs 8 and 9, a phase-shifter 10, a coupler 11, and band pass filters (BPF) 12 and 13 composed of surface acoustic wave (SAW) filters. The high-frequency hybrid switch module is connected to a detector 14, transmission power amplifiers 15 and 16 for the systems, and low-noise amplifiers (LNAs) 17 and 18 for the systems.

The high-frequency hybrid switch module in which the SP3T switch 7 selects one between a transmitting signal and a received signal serves as a duplexer. Undesired harmonics generated in the transmission power amplifiers 15 and 16 are eliminated by the LPFs 8 and 9. Undesired components in a signal received through the antenna port 1 are eliminated by the BPFs 12 and 13. Harmonics generated in the SP3T switch 7 or any other component are eliminated by the LPF 6 in a transmission mode. The coupler 11 and the detector 14 monitor a level of an output signal and control an operation of the transmission power amplifiers 15 and 16 when needed. Impedance matching of the BPFs 12 and 13 is conducted by the phase-shifter 10 connected between the BPFs 12, 13 and the SP3T switch 7.

As shown in FIG. 1, the switch module of this embodiment is implemented by an FET switch. The FET switch includes plural FETs connected for performing a complex switching operation, such as SP2T, SP3T, or SP4T, as a microwave monolithic integrated circuit (MMIC) in the form of an IC chip. According to the embodiment, the FET switch is provided as the MMIC on a layer assembly including an LPF function, a protection from static electricity, and a phase-shifting function formed in the assembly. Accordingly, the high-frequency hybrid switch module of this embodiment has small overall dimensions and a high performance.

A conventional switch module employs diodes, thus hardly providing a complex switching circuit. It is also difficult for an FET switching IC solely to provide the LPF function, the anti-static protection, and the phase-shifting function. Those functions are implemented only in a mother circuit board. As the result, the conventional switch module is unfavorable for providing a compact configuration and for reducing loss by complex wiring on the mother circuit board. Accordingly, the conventional module not only has a declining performance but also needs a long time for its development. The module of the embodiment includes an FET switch IC on the layered assembly having various functions and is constructed as a single module, thus overcoming above issues of the conventional switch module.

Figure 2:
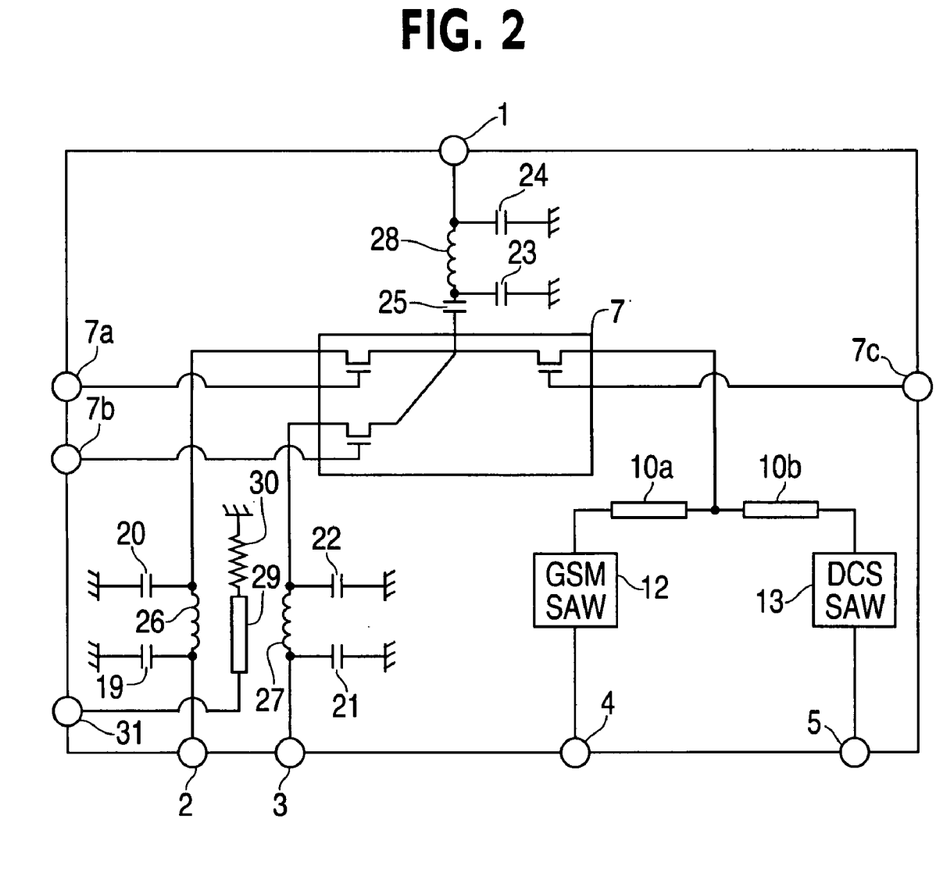
FIG. 2 is a detailed circuitry diagram of the high-frequency hybrid switch module according to embodiment 1.

FIG. 2 illustrates a detail of the circuitry block diagram of FIG. 1. The circuit block includes capacitors 19 to 25, inductors 26 to 28, a coupling line 29, and a resistor 30.

The SP3T switch 7 may be implemented by a GaAs field effect transistor (FET) having control ports 7a to 7c. The phase shifter 10 consists of phase-shifters 10a and 10b. The phase shifter 10a has an electrical length such that an impedance towards the BPF 13 from the connection point of the phase shifter 10a and the SP3T switch 3 in a frequency range passing through the BPF 12 is substantially open. The phase shifter 10b has an electrical length such that an impedance towards the BPF 12 from the connection point of the shifter 10b and the SP3T switch 3 in a frequency range passing through the BPF 13 is substantially open. This arrangement allows the SP3T switch 7 to function as a transmission/reception switch in a dual-band system, hence contributing to a low cost and a small size of a switching element composing the switch.

The LPFs 8, 9 and the coupler 11 is implemented by the capacitors 19 to 22, the inductors 26 and 27, the coupling line 29, and the resistor 30. The inductors 26 and 27 serving as portions of the LPFs 8 and 9 construct the coupler 11. Accordingly, as the number of components is significantly reduced, the high-frequency hybrid switch module can have reduced overall dimensions and reduced loss.

The antenna port 1 is isolated in DC from the switch 7 with the capacitor 25, thus improving the usability of the high-frequency hybrid switch module. This advantage may be obtained by disposing capacitors between the SP3T switch 7, the transmitting ports 2, 3, and the receiving ports 4, 5.

The LPF 6 is implemented by the capacitors 23 and 24 and the inductor 28 which are connected between the antenna port 1 and the SP3T switch 7 and can thus eliminate undesired harmonics generated in the transmission mode by the SP3T switch 7, hence contributing to a higher performance of the high-frequency hybrid switch module. In case that the switch 7 is free from harmonic distortion, the LPF 6 may be eliminated. The capacitor 23 or 24 may be replaced by a high-frequency varistor, which protects the switch 7 from being broken down by a static-electricity serge applied through the antenna port 1, hence further contributing to high performance of the high-frequency hybrid switch module.

Figure 3:
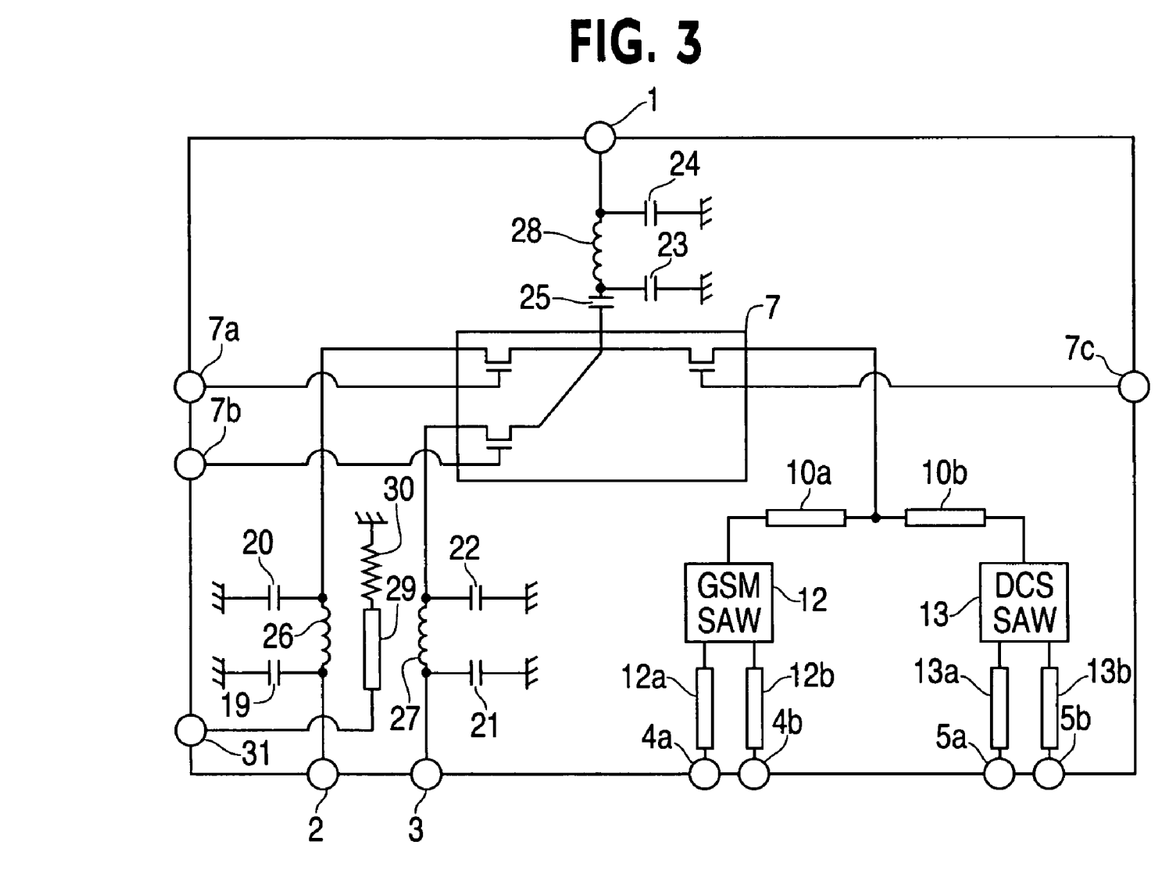
FIG. 3 is a circuitry diagram of another high-frequency hybrid switch module according to embodiment 1.

FIG. 3 illustrates another circuitry of the module according to embodiment 1, where the BPFs 12 and 13 are implemented by SAW filters of an unbalanced input/balanced output type. The transmission lines 12a, 12b, 13a, and 13b at a balanced output side are connected to output ports 4a, 4b, 5a, and 5b, respectively. Upon the transmission lines 12a, 12b, 13a, and 13b being optimized in lengths and impedances, the high-frequency hybrid switch module can produce balanced outputs with no use of a balun.

Figure 4:
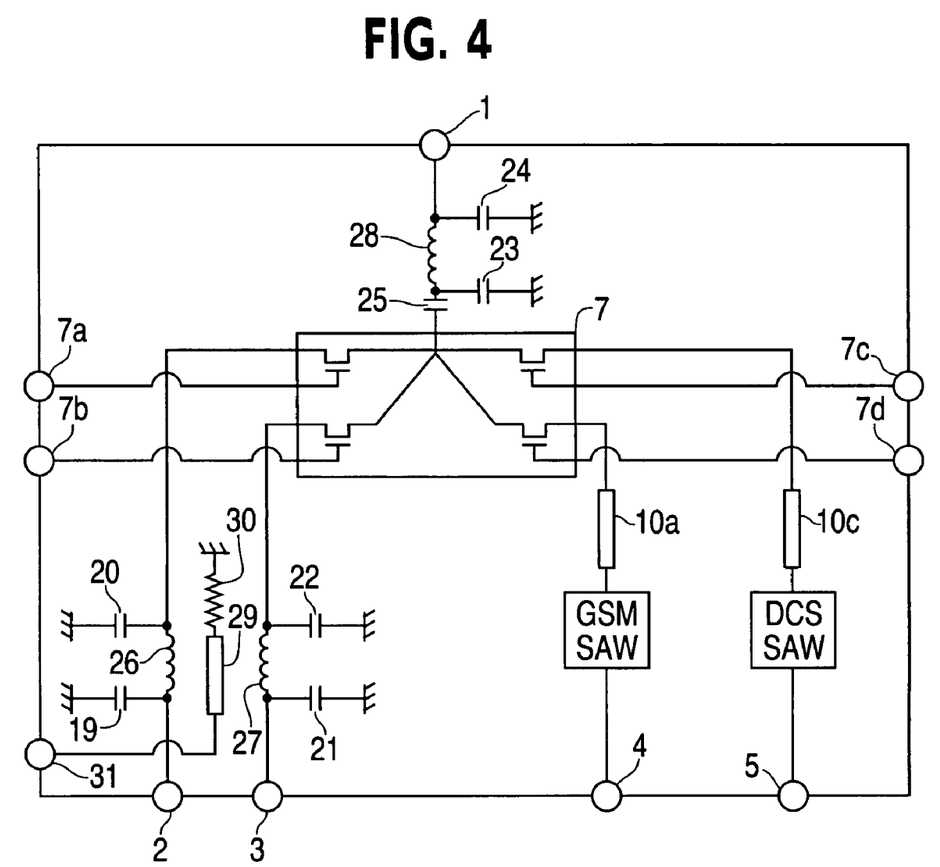
FIG. 4 is a circuitry diagram of a further high-frequency hybrid switch module according to embodiment 1.

As shown in FIG. 4, alternatively, the switch 7 of embodiment 1 may be implemented by an SP4T switch with equal success.

(Exemplary Embodiment 2)

Figure 5:
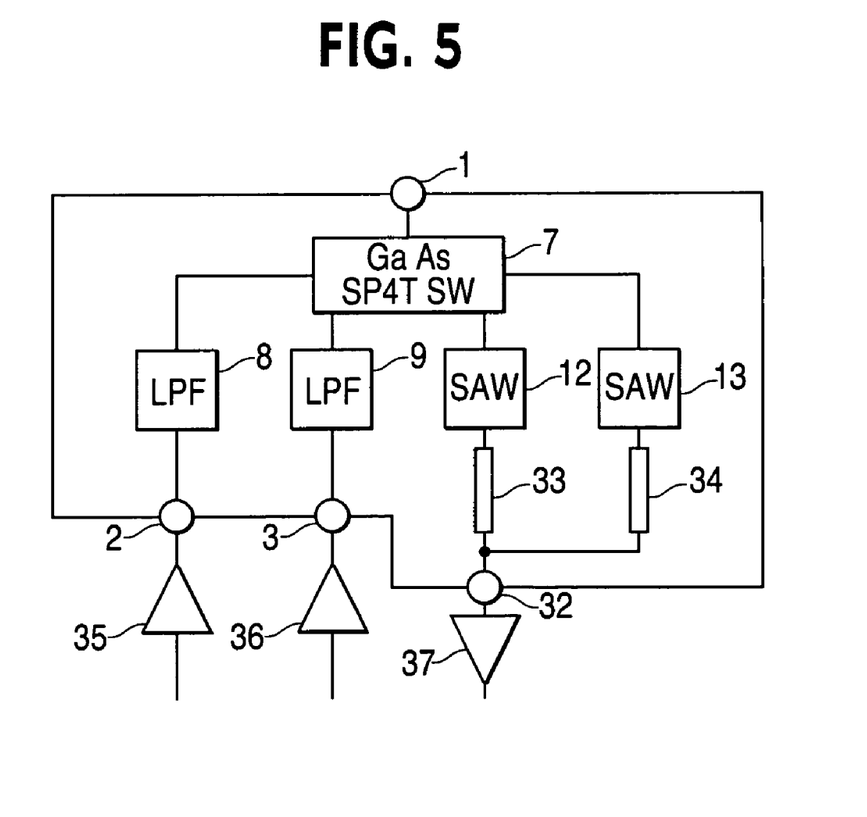
FIG. 5 is a circuitry block diagram of a high-frequency hybrid switch module according to exemplary embodiment 2 of the invention.

FIG. 5 is a circuitry block diagram of a high-frequency hybrid switch module according to exemplary embodiment 2 of the present invention. The module shown in FIG. 5 may be used as a compatible apparatus for both GSM and DCS in a European mobile telephone system. The module includes a receiving port 32, phase shifters 33 and 34, and an SP4T switch 7. The module is connected to power amplifiers 35 and 36 for transmission and a low-noise amplifier (LNA) 37 for reception.

Particularly in embodiment 2, phase shifters 33 and 34 are connected to respective output ends of band pass filters (BPF) 12 and 13 at a receiving side. The phase shifter 34 has an electrical length such that an impedance towards the BPF 13 from the receiving port 32 in a frequency range passing through the BPF 12 is substantially open. The phase shifter 33 has an electrical length such that an impedance towards the BPF 12 from the receiving port 32 in a frequency rage passing through the BPF 13 is substantially open.

This arrangement allows a single LNA to replace two LNAs which are connected to outside and are mandatory in the conventional circuit. Accordingly, the high-frequency hybrid switch module can be utilized in a mobile terminal having low cost and small overall size.

The SP4T switch 7 in this module may be replaced by an SP3T switch, as shown in FIG. 1 with equal success.

Figure 6:
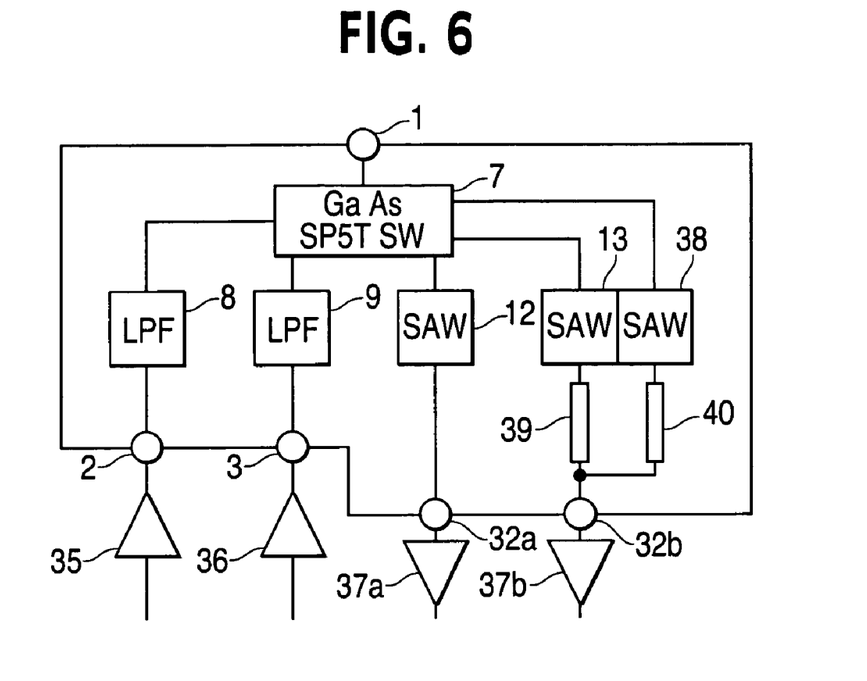
FIG. 6 is a circuitry diagram of another high-frequency hybrid switch module according to embodiment 2.

FIG. 6 illustrates another module which handles three different frequency bands, the GSM and DCS in Europe and the PCS in the U.S. The module includes an SP5T switch 7, a BPF 38 at a receiving side, a phase shifter 39 connected between a BPF 13 at a receiving side and a receiving port 32b, and a phase shifter 40 connected between the BPF 38 and the receiving port 32b. The BPFs pass frequency bands close to each other, namely DCS and PCS, and have their respective output ends connected through the phase shifters 39 and 40 to the common port 32b. The common port 32b is connected to an LNA 37b.

Since the output ends of the BPFs passing close frequency bands are joined at a single port, influence of frequency characteristics of the LNA against an input signal can be reduced, thus contributing to stability of the module. The joining of the output ends of the BPFs allows a triple band type of the high-frequency hybrid switch module to have a low cost, a small size, and improved operation stability.

Figure 7:
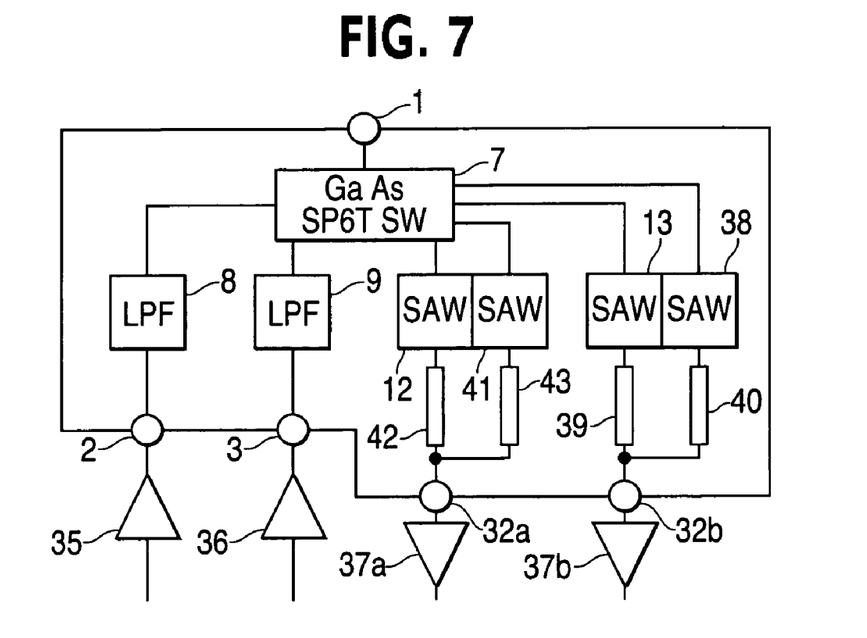
FIG. 7 is a circuitry diagram of a further high-frequency hybrid switch module according to embodiment 2.

FIG. 7 illustrates a further high-frequency hybrid switch module of embodiment 2 which is designed to handle four different frequency bands of the GSM and DCS in Europe, and the AMPS and PCS in the U.S. The module includes an SP6T switch 7, a BPF 41 at a receiving side, a phase shifter 42 connected between a BPF 12 and a receiving port 32a, and a phase shifter 43 connected between the BPF 41 and the receiving port 32a. Output ends of the BPFs having comparatively-close frequency bands, for example, GMS and AMPS, are connected through the phase shifters 42 and 43 to a common port 32a. The common port 32a is connected to an LNA 37a. Similarly, output ends of the other BPFs having comparatively-close frequency bands, for example, DCS and PCS, are connected through phase shifters 39 and 40 to the common port 32b. The common port 32b is connected to an LNA 37b.

Since the output ends of the BPFs are joined at the output port, effect of frequency characteristics to an input signal of the LNA can be reduced, thus contributing to stability of the module. The joining of the output ends of the BPFs allows a quadruple band type of the high-frequency hybrid switch module to have a low cost, a small size, and improved operating stability.

Figure 8A:
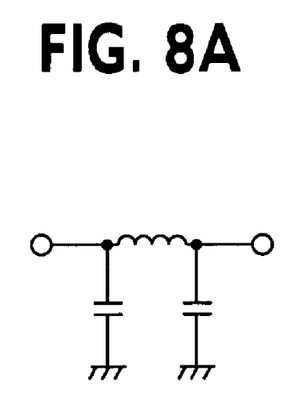
FIG. 8 is a circuitry diagram of a transmission line used in the high-frequency hybrid switch module according to the embodiments of the invention.
Figure 8B:
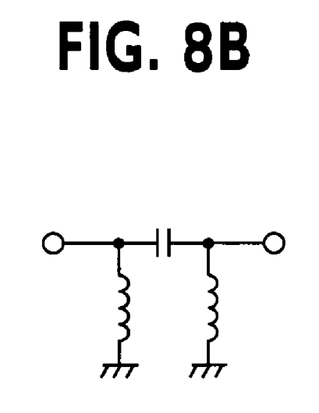

The phase shifters 10, 33, 34, 39, 40, 42, and 43 of embodiments 1 and 2 may be implemented by distributed constant circuits, such as micro-strip circuits or strip circuits, or by concentrated constant circuits shown in FIGS. 8A and 8B.

Figure 9:
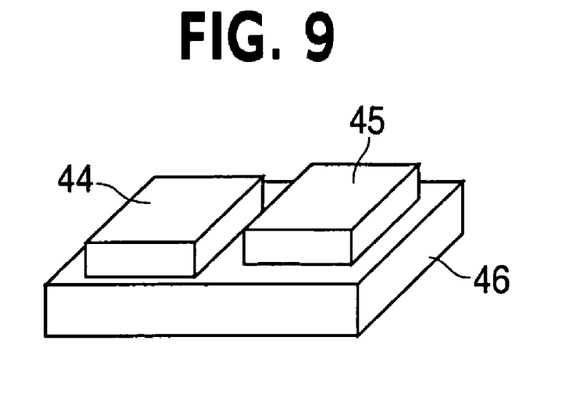
FIG. 9 is a perspective view of the high-frequency hybrid switch module according to the embodiments of the invention.

FIG. 9 is a perspective view of each high-frequency hybrid switch module of embodiment 1 and 2. The module includes a switching element 44, a SAW device 45, and a layered assembly 46 made of dielectric material, such as ceramic. The layered assembly 46 includes LC circuits of the LPFs and couplers with electrodes provided on inner layers of the assembly. The switching element 44 and the SAW device 45 are mounted on the upper surface of the layered assembly 46. The SAW device 45 includes all the SAW filters in the module. This arrangement allows the high-frequency hybrid switch module to have a small overall size and a low cost.

According to embodiment 1 and 2, the LPFs 6, 8, and 9, the coupler line 29 in the coupler 11, the phase-shifting lines 10, 33, 34, 39, 40, 42, 43, 12a, 12b, 13a, and 13b may be implemented as inner electrodes in the layered assembly 46. These electrodes are connected to the resistor 30, the switching element 44, and the SAW device 45 through via-links provided on the inner layers. This arrangement can eliminate electrodes for connection provided on the upper surface of the layered assembly 46. Components are surface-mounted on the layer assembly 46 at a high density, thus reducing lengths of their lead wires, and thus the high-frequency hybrid switch module can have a small size and a low loss. The high-frequency hybrid switch module has no electrodes for connection on its surfaces and can thus have a high operational reliability without suffering from effects of electrode deterioration and peeling off under moisture conditions.

The layered assembly of the dielectric material may be used as a package for the SAW filters. More particularly, the layered assembly has a recess provided therein where a SAW chip is accommodated and packaged. This requires no process for of packaging the SAW chip, hence contributing to a low cost and a small size of the high-frequency hybrid switch module.

The SAW filters may be mounted on a single piezoelectric layer. Since the number of the SAW chips is reduced, the module can have a small overall size. Particularly if the layered assembly serves as a package of the SAW filters, the module can be fabricated with less difficulty with the package having a smaller opening.

Figure 10A:
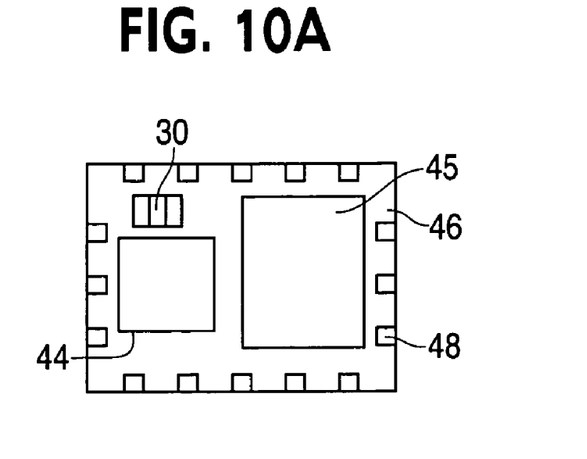
FIG. 10A is a top view of another high-frequency hybrid switch module according to the embodiments of the invention.
Figure 10B:
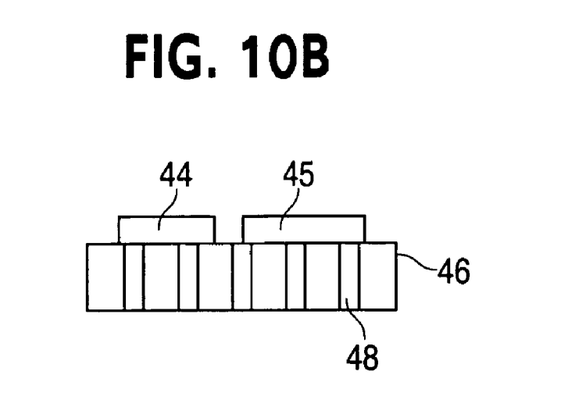
FIG. 10B is a side view of another high-frequency hybrid switch module according to the embodiments of the invention.
Figure 10C:
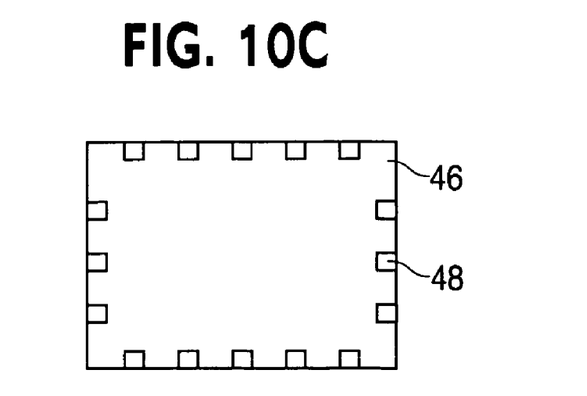
FIG. 10C is a bottom view of another high-frequency hybrid switch module according to the embodiments of the invention.

As shown in FIG. 10A, the resistance of the resistor 30 in the coupler 11 mounted on the surface of the dielectric layered assembly 46 may adjustably be determined by, e.g. laser trimming. Accordingly, the high-frequency hybrid switch module can have large accuracy and productivity. The resistor 30 may be printed on the surface of the layered assembly but not mounted as a chip component. As shown in FIGS. 10A to 10C, the input and output ports for external connection are commonly provided as end electrodes 48 and may be implemented by a land grid array (LGA) for socket connection with no use of soldering.

Figure 11:
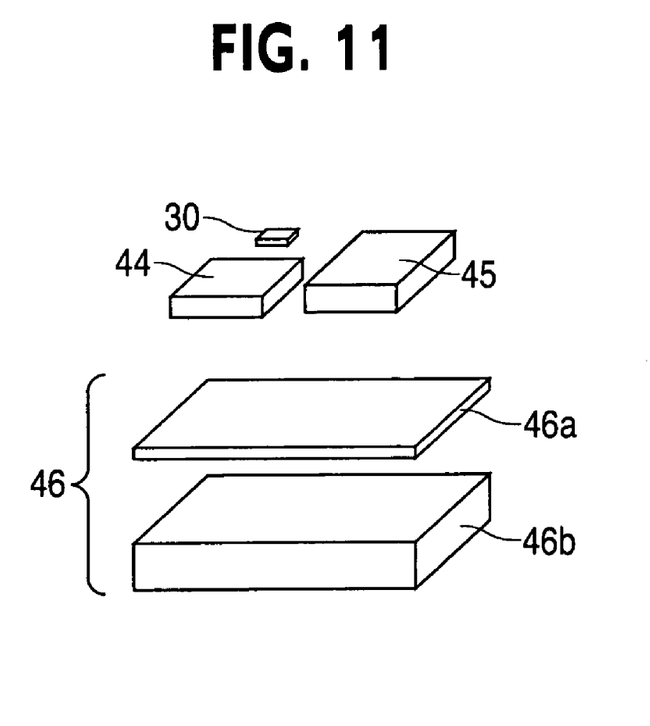
FIG. 11 is a schematic view of a further high-frequency hybrid switch module according to embodiments of the invention.

The LPF 6 of embodiment 2 may be connected between the antenna port 1 and the switch 7 similarly to embodiment 1. In this case, the LPF 6 may be composed of capacitors 23, 24 and an inductor 28. If the capacitor 23 and/or 24 is a high-frequency varistor, the switch 7 can be protected from being broken down by a static-electricity serge. In case that the varistor for the capacitors 23 and 24 of embodiment 1 and 2 is made from a portion of a layer of material of the varistor in the layered assembly as shown in FIG. 11, the high-frequency hybrid switch module can have resistance against static electricity while having a small overall size. As shown in FIG. 11, the layered assembly 46 may include a varistor layer 46a and a dielectric layer 46b, and the capacitor 23 and/or 24 may be implemented by electrodes facing each other across the varistor layer 46a. This arrangement eliminates a varistor of a chip component, and reduces the number of components. Since the number of the components mounted on the layered assembly 26, the high-frequency hybrid switch module can have a small overall size. The capacitance of the varistor of this arrangement is desirably adjusted by areas of the electrodes according to the dielectric constant of the material of the varistor and the thickness of the layer, hence allowing the module to be designed easily.

The varistor layer 46a is situated at the top of the layer assembly 46 shown in FIG. 11. The layer may be disposed in an intermediate or lower region of the layered assembly 46.

INDUSTRIAL APPLICABILITY

A high-frequency hybrid switch module according to the present invention has a small overall size, a low cost, and a small loss.

What is claimed is:

1. A high-frequency hybrid switch module comprising:
an antenna port;
a field effect transistor (FET) switch coupled to said antenna port and including an FET;
a control port for controlling said FET switch;
first and second transmitting ports;
a first low pass filter (LPF) provided between said first transmitting port and said FET switch;

a second LPF provided between said second transmitting port and said FET switch;
first and second surface acoustic wave (SAW) filters having respective input ends coupled to said FET switch;
first and second phase shifters connected in series with said first and second SAW filters, respectively; and
a layered assembly having said FET switch and said first and second SAW filters mounted thereon, said layered assembly including
a dielectric layer, and
an electrode pattern provided on said dielectric layer for serving as at least a portion of said first and second LPFs and said first and second phase shifters.

2. The high-frequency hybrid switch module according to claim 1, further comprising a package for accommodating said first and second SAW filters.

3. The high-frequency hybrid switch module according to claim 2, wherein said layered assembly serves as said package.

4. The high-frequency hybrid switch module according to claim 1, wherein at least one of respective output ends of said first and second SAW filters is of a balanced output type.

5. The high-frequency hybrid switch module according to claim 1,
wherein said FET switch comprises an SP3T switch having three switching ports, and
wherein two of said three switching ports are connected to said first and second LPFs, respectively, and other of said switching ports is connected to said first and second phase shifters.

6. The high-frequency hybrid switch module according to claim 5, further comprising:
a capacitor connected between said first phase shifter and said FET switch; and
another capacitor connected between said second phase shifter and said FET switch.

7. The high-frequency hybrid switch module according to claim 5, further comprising a first capacitor connected between said first LPF and said FET switch.

8. The high-frequency hybrid switch module according to claim 7, further comprising a second capacitor provided between said second LPF and said FET switch.

9. The high-frequency hybrid switch module according to claim 1,
wherein said FET switch comprises an SP4T switch having four switching ports, and
two of said four switching ports are connected to said first and second LPFs, respectively, and other two switching ports are connected to said first and second phase shifters, respectively.

10. The high-frequency hybrid switch module according to claim 9, further comprising:
third and fourth phase shifters having respective one ends connected to respective output ends of said first and second SAW filters, and
a receiving port connected to respective other ends of said third and fourth phase shifters,
wherein said first and second phase shifters have respective one ends to said respective input ends of said first and second SAW filters.

11. The high-frequency hybrid switch module according to claim 9, further comprising:
a capacitor connected between said first phase shifter and said FET switch; and
another capacitor connected between said second phase shifter and said FET switch.

12. The high-frequency hybrid switch module according to claim 9, further comprising a first capacitor connected between said first LPF and said FET switch.

13. The high-frequency hybrid switch module according to claim 12, further comprising a second capacitor connected between said second LPF and said FET switch.

14. The high-frequency hybrid switch module according to claim 1, further comprising:
a third phase shifter connected to said FET switch; and
a third SAW filter connected in series with said third phase shifter,
wherein said FET switch comprises an SP5T switch having five switching ports,
two of said five switching ports are connected to said first and second LPFs, respectively, and other three switching ports are connected to said first, second, and third phase shifters, respectively.

15. The high-frequency hybrid switch module according to claim 14, further comprising
fourth and fifth phase shifters having respective one ends connected to respective output ends of said first and second SAW filters; and
a receiving port connected to respective other ends of said fourth and fifth phase shifters,
wherein said first and second phase shifters having respective one ends connected to said respective input ends of said first and second SAW filters.

16. The high-frequency hybrid switch module according to claim 14, further comprising:
a capacitor connected between said first phase shifter and said FET switch;
another capacitor connected between said second phase shifter and said FET switch; and
a further capacitor connected between said third phase shifter and said FET switch.

17. The high-frequency hybrid switch module according to claim 14, further comprising a first capacitor connected between said first LPF and said FET switch.

18. The high-frequency hybrid switch module according to claim 14, further comprising a second capacitor connected between said second LPF and said FET switch.

19. The high-frequency hybrid switch module according to claim 14, further comprising a package for accommodating said first, second, and third SAW filters therein.

20. The high-frequency hybrid switch module according to claim 14, wherein at least one of respective output ends of said first, second, and third SAW filters is of a balanced output type.

21. The high-frequency hybrid switch module according to claim 1, further comprising:
third and fourth phase shifters connected to said FET switch; and
third and fourth SAW filters connected in series with said third and fourth phase shifters, respectively,
wherein said FET switch comprises an SP6T switch having six switching ports,
two of said six switching ports are connected to said first and second LPFs, respectively, and
said other four switching ports are connected to said first, second, third, and fourth phase shifters, respectively.

22. A high-frequency hybrid switch module according to claim 21, further comprising:
fifth and sixth phase shifters having respective one ends connected to respective output ends of said first and second SAW filters; and a first receiving port connected to respective other ends of said fifth and sixth phase shifters, wherein said first and second phase shifters have respective one ends connected to said respective input ends of said first and second SAW filters.

23. The high-frequency hybrid switch module according to claim 22, further comprising:

seventh and eighth phase shifters having respective one ends connected to respective output ends of said third and fourth SAW filters; and a second receiving port connected to respective other ends of said seventh and eighth phase shifters, wherein said third and fourth phase shifters having respective one ends connected to respective input ends of said third and fourth SAW filters.

24. The high-frequency hybrid switch module according to claim 21, further comprising:

a capacitor connected between said first phase shifter and said FET switch;

another capacitor connected between said second phase shifter and said FET switch;

a further capacitor connected between said third phase shifter and said FET switch; and a still further capacitor connected between said fourth phase shifter and said FET switch.

25. The high-frequency hybrid switch module according to claim 21, further comprising a first capacitor connected between said first LPF and said FET switch.

26. The high-frequency hybrid switch module according to claim 25, further comprising a second capacitor connected between said second LPF and said FET switch.

27. The high-frequency hybrid switch module according to claim 21, further comprising a package for accommodating said first, second, third, and fourth SAW filters therein.

28. The high-frequency hybrid switch module according to claim 27, wherein said layered assembly serves as said package.

29. The high-frequency hybrid switch module according to claim 21, wherein at least one of respective output ends of said first, second, third, and fourth SAW filters is of a balanced output type.

30. The high-frequency hybrid switch module according to claim 1, further comprising:

a filter circuit provided between said antenna port and said FET switch and having a varistor mounted on said layered assembly.

31. The high-frequency hybrid switch module according to claim 30, further comprising a capacitor connected between said filter circuit and said FET switch.

32. The high-frequency hybrid switch module according to claim 30, wherein said layered assembly includes another layer in which said varistor is provided.

33. The high-frequency hybrid switch module according to claim 1, further comprising a coupler implemented by said electrode pattern and connected commonly to said first and second LPFs.

34. The high-frequency hybrid switch module according to claim 33, further comprising a resistor disposed on said layered assembly and connected between said coupler and a ground, said resistor capable of being trimmed.

* * * * *

UNITED STATES PATENT AND TRADEMARK OFFICE
CERTIFICATE OF CORRECTION

PATENT NO.         : 7,010,273 B2                                              Page 1 of 1
APPLICATION NO. : 10/381657
DATED              : March 7, 2006
INVENTOR(S)        : Yuki Satoh et al.

It is certified that error appears in the above-identified patent and that said Letters Patent is hereby corrected as shown below:

<u>Claim 9:</u>

In column 7, line 49, please replace "ports arc connected" with --ports are connected--.

<u>Claim 10:</u>

In column 7, line 57, please replace "SAW filters, and" with --SAW filters; and--.

Signed and Sealed this

Thirtieth Day of January, 2007

JON W. DUDAS
*Director of the United States Patent and Trademark Office*